2,807,586

LEAD ACTIVATED CALCIUM TUNGSTATE PHOSPHOR CONTAINING SMALL AMOUNTS OF SODIUM AND LITHIUM

Gerald L. Moran, Towanda, Pa., assignor to Sylvania Electric Products Inc., Salem, Mass., a corporation of Massachusetts No Drawing. Application April 28, 1950,
Serial No. 158,907

6 Claims. (Cl. 252—301.5)

This invention relates to phosphors, and particularly to phosphors for use in fluorescent lamps and the like.

The use of blue-emitting phosphors in such devices has heretofore been attended by difficulties in starting.

My invention provides a phosphor of good starting characteristics, together with improved color and brightness, and greater ease of manufacture.

These objects are achieved by a lead-activated calcium magnesium tungstate phosphor, preferably with the addition of a small amount of lithium or sodium.

Other objects, features and advantages of the invention will be apparent from the following specification.

According to the invention, I may, for example, mix intimately together the following materials, finely-powdered, in the molal proportions stated:

| | |
|---|---|
| $CaCO_3$ | 0.98 |
| $MgCO_3$ | 0.30 |
| $WO_3$ | 1.00 |
| $PbO_2$ | 0.01 |

The proportions given are not critical, although the color will vary if they are greatly changed. The magnesium carbonate may vary from 0.1 to 0.4 mol, for example, and the lead oxide from 0.005 to 0.02 mol. The carbonates may be replaced by the oxides and vice-versa, the compounds used generally being those reducible to the oxides on heating.

The brightness of the resultant phosphor will be increased by the addition of a small amount of lithium or sodium, for example in the form of the carbonate, for example about 0.01% by weight of lithium on the weight of $CaCO_3$ being added as lithium carbonate to the mixture before firing. The mixture may be fired for 6 hours at about 1875° F., for example, ball-milled, then refired for 3 hours at 1650° F. The firing schedule is not at all critical, temperatures as low as 1775° F. and up to 1925° F. having been used.

The lithium or sodium may conveniently be added as the carbonate, the effect of various percentages added as shown above and the resultant mixture fired, being shown below, the relative brightness and the particle size being determined by methods well-known in the art:

| | Relative brightness | Relative particle size |
|---|---|---|
| Percent lithium (by wt. of Li on $CaCO_3$): | | |
| 0.000 | 96 | 3.4 |
| 0.005 | 99 | 4.2 |
| 0.01 | 103 | 5.1 |
| 0.03 | 106 | 8.5 |
| Percent sodium (by wt. of Na on $CaCO_3$): | | |
| 0.000 | 96 | 3.6 |
| 0.01 | 100 | 3.9 |
| 0.03 | 101 | 4.5 |
| 0.06 | 104 | 5.9 |

The table shows that even a very small addition of lithium or sodium is helpful. Since the particle size of the phosphor increases with increasing lithium or sodium content, the amount of the addition is best kept small, about 0.01% Li or 0.03% Na being very satisfactory in all respects.

For convenience in the above tests, the percentage of lithium and sodium was taken with respect to the amount of calcium carbonate in the mixture.

The manufacture of the new phosphor, calcium magnesium tungstate activated by lead, and preferably containing some lithium of sodium, is much less critical, and hence more suitable for manufacture, than the ordinary calcium tungstate lead-activated blue phosphor, which has no magnesium. The latter must be ball-milled and fired in trays, whereas the phosphor according to my invention may be merely hammer-milled and then fired in open crucibles. The new phosphor, calcium magnesium tungstate activated by lead and preferably containing some lithium or sodium is an extremely flexible phosphor for by varying the formula and firing schedule in proper combination it is possible to get an appreciable range of color, brightness and particle size.

What I claim is:

1. A lead-activated calcium magnesium tungstate phosphor containing about 0.01% lithium, calculated as lithium carbonate, by weight of the equivalent amount of calcium carbonate corresponding to the amount of calcium present in the phosphor, the lithium being chemically combined in the phosphor.

2. A lead-activated calcium magnesium tungstate phosphor containing about 0.03% sodium, calculated as sodium carbonate, by weight of the equivalent amount of calcium carbonate corresponding to the amount of calcium present in the phosphor, the sodium being chemically combined in the phosphor.

3. A lead-activated calcium magnesium tungstate phosphor containing in the amount specified a substance selected from the group consisting of about 0.03% sodium and 0.01% lithium, calculated as the respective carbonate, by weight of the equivalent amount of calcium carbonate corresponding to the amount of calcium in the mixture, the substance selected being chemically combined with the phosphor.

4. A lead-activated calcium magnesium tungstate phosphor in which the magnesium is between about 0.1 to 0.4 gram atoms per gram atom of tungsten, and the lead is between about 0.005 to about 0.02 gram atoms per gram atom of tungsten, and the calcium is about 0.98 gram atom per gram atom of tungsten, said phosphor containing about 0.01% lithium, calculated as lithium carbonate, by weight of the equivalent amount of calcium carbonate corresponding to the amount of calcium present in the phosphor.

5. A lead-activated calcium magnesium tungstate phosphor in which the magnesium is between about 0.1 to about 0.4 gram atom per gram atom of tungsten, and the lead is between about 0.005 to about 0.02 gram atom per gram atom of tungsten, and the calcium is about 0.98 gram atom per gram atom of tungsten, said phosphor containing about 0.03% sodium, calculated as sodium carbonate, by weight of the equivalent amount of calcium carbonate corresponding to the amount of sodium present in the phosphor.

6. A lead-activated calcium magnesium tungstate phosphor in which the magnesium is between about 0.1 to about 0.4 gram atom per gram atom of tungsten, and the lead is between about 0.005 to about 0.02 gram atom per gram atom of tungsten, and the calcium is about 0.98 gram atom per gram atom of tungsten, said phosphor containing in the amount specified a substance selected from the group consisting of about 0.03% sodium and 0.01% lithium calculated as the respective carbonate, by weight of the equivalent amount of calcium carbonate corresponding to the amount of calcium in the mixture.

References Cited in the file of this patent

UNITED STATES PATENTS

| | | |
|---|---|---|
| 2,180,734 | George | Nov. 21, 1939 |
| 2,225,704 | McKeag | Dec. 24, 1940 |
| 2,617,773 | Nagy | Nov. 11, 1952 |

FOREIGN PATENTS

| | | |
|---|---|---|
| 567,494 | Great Britain | Feb. 16, 1945 |